No. 872,802. PATENTED DEC. 3, 1907.
G. EHMANN.
TROLLEY.
APPLICATION FILED JUNE 19, 1906.
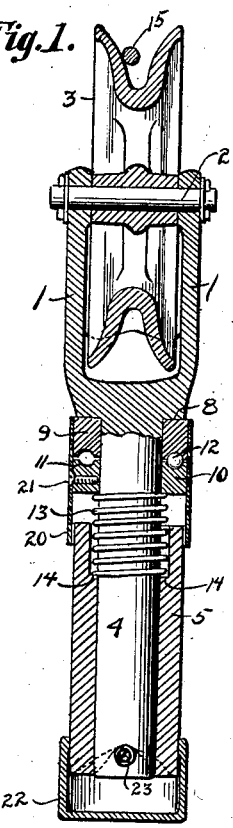
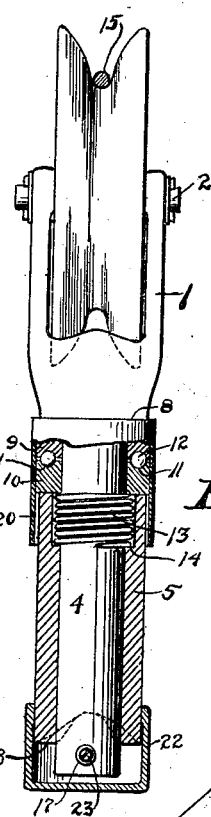
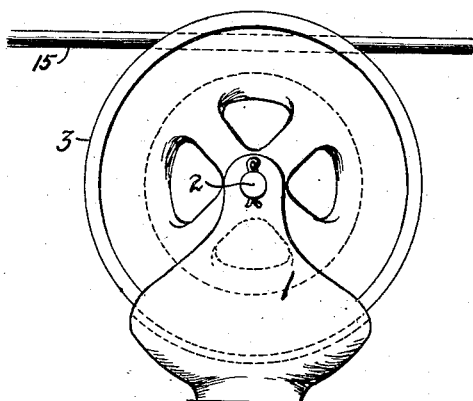
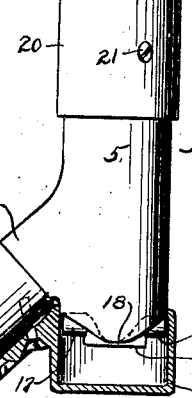
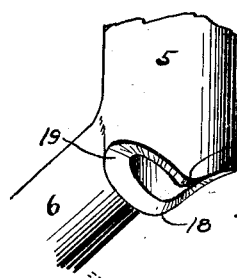
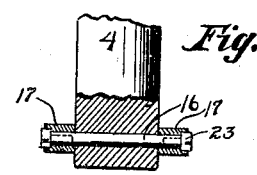
Witnesses
Jos. J. Hosler.
Sylvia Boron.
Inventor
Gustav Ehmann,
By H. W. Bond
Attorney

UNITED STATES PATENT OFFICE.

GUSTAV EHMANN, OF CANTON, OHIO.

TROLLEY.

No. 872,802.　　　Specification of Letters Patent.　　　Patented Dec. 3, 1907.

Application filed June 19, 1906. Serial No. 322,480.

*To all whom it may concern:*

Be it known that I, GUSTAV EHMANN, a citizen of the United States, residing at Canton, in the county of Stark and State of Ohio, have invented certain new and useful Improvements in Trolleys; and I do hereby declare that the following is a full, clear, and exact description of the same, reference being had to the accompanying drawing, making a part of this specification, and to the numerals and figures of reference marked thereon, in which—

Figure 1 is a vertical section of the harp and trolley wheel, and a longitudinal section of the spring barrel showing the harp stem located therein, also showing the anti-friction rings in section. Fig. 2 is an edge view of the trolley wheel and harp showing the harp stem in its barrel and the spring compressed. Fig. 3 is a side elevation of the trolley head proper, showing parts in section. Fig. 4 is a view showing the bottom or lower end of the harp stem showing parts in section. Fig. 5 is a view showing the bottom or lower end of the harp stem barrel and a portion of the trolley pole connecting arm. Fig. 6 is a view showing the top or upper portion of a car in dotted lines, and illustrating the position of the trolley wheel and pole with reference to a curved trolley wire.

The present invention has relation to trolleys, and it consists in the different parts and combination of parts and the novel construction hereinafter described and particularly pointed out in the claims.

Similar numerals of reference indicate corresponding parts in all the figures of the drawing.

In the accompanying drawing, 1 represents the harp, which may be of the form shown and to which is attached the axle 2, upon which axle is mounted the trolley wheel 3 in the usual manner. The harp 1 is provided with the integral stem 4, which stem is located and held in the barrel 5, which barrel is provided with the lateral or angled arm 6, to which arm is attached the top or upper end of the trolley pole 7, which trolley pole may be of any desired construction. The trolley pole within itself forms no particular part of the present invention; but it will be understood that a trolley pole of some kind must necessarily be present to carry out the object and purpose hereinafter described. The bottom or lower end of the harp 1 is provided with the shoulder 8 against which shoulder is located the top or upper face of the upper ring 9. Below the ring 9 is located the ring 10, said rings being provided with semi-circular grooves 11 in which grooves are placed the ball bearings 12, which ball bearings are for the purpose of reducing the friction between the rings 9 and 10. Below the ring 10 and in contact therewith is located the spring 13, which spring is located in the top or upper end of the barrel 5, the bottom or lower end of said spring resting upon the shoulder 14, by which arrangement the spring 13 is confined between the lower ring 10 and the shoulder 14, and by such confinement the spring will have a tendency at all times to move the rings 10 and the harp 1 together with the harp stem 4 upward, and hold said parts in the position illustrated in Fig. 1.

When the trolley wheel 3 is brought into proper contact with the trolley wire 15, the upward pressure of the trolley pole will force the trolley wheel 3 into proper contact with the trolley wire in the usual manner; and by said pressure the spring 13 will be compressed as shown in Fig. 2, moving the harp stem 4 and the rings 9 and 10 downward or toward the top or upper end of the barrel 5, until the ring 10 comes in contact with the top or upper end of said barrel.

It is well understood that it is necessary at all times to have the axle of the trolley wheel at right angles to the trolley wire at the time the trolley wheel 3 is to be connected or attached to the trolley wire and in order to accomplish this result the bottom or lower end of the harp stem 4 is provided with the cross pin 16, upon which cross pin are mounted the anti-friction rollers 17, said parts being located and arranged as best illustrated in Fig. 4. The bottom or lower end of the barrel 4 is substantially of the form shown in Fig. 5, and as shown it is provided with the parallel extensions 18 between which parallel extensions are located the cut out portions or the openings 19, the wall of the openings and the extensions constituting a cam tread for the anti-friction rollers 17.

It will be understood that when the trolley wheel 3 is removed or accidentally detached from the trolley wire the spring 13 will come into action and move the harp stem upward, thereby bringing the anti-friction rollers 17 into contact with the wall or cam at the bottom or lower end of the barrel 5 and by reason of the formation of the lower end of the barrel the harp stem will be rotated axially until the anti-friction rollers 17 are brought into engagement with the extreme upper portions or tops of the opening 19, thereby bringing the axle of the trolley wheel at right angles to the trolley wire, thereby automatically adjusting the trolley wheel for position to be connected to the trolley wire. When the trolley wheel is in contact with the trolley wire the harp 1 and its stem 4 will be moved downward with reference to the barrel 5, which brings the anti-friction rollers 17 mounted upon the cross pin 16 out of contact with the bottom or lower end of the barrel 5 at which time the harp stem 4 is free to rotate axially thereby allowing the trolley wheel 3 to adjust itself or follow the trolley wire regardless of the degree of curvature of the trolley wire.

For the purpose of protecting the spring 13 at all times and also the joint between the rings 9 and 10 the band or covering 20 is provided, which is securely attached to the lower ring 10 by means of screws 21 or their equivalents. The band 20 being so formed that it is free to move up and down upon the barrel 5.

For the purpose of protecting the anti-friction bearings 17, the housing 22 is provided, which is connected to the arm 6 or its equivalent or it may be connected to the top or upper end of the pole, but I prefer to connect the housing 22 direct to the arm 6 so as to provide a complete structure within itself, which can be attached to trolley poles without reference to any specific construction.

It will be understood that by providing the spring 13 that a longitudinal movement of the stem can be imparted and is imparted to the stem thereby providing a yielding contact as between the trolley wheel and trolley wire independent of the trolley pole.

For the purpose of holding the anti-friction rollers in position the screws 23 are provided, which are connected to the cross pin in the usual manner.

Having fully described my invention what I claim as new and desire to secure by Letters Patent, is—

In a trolley of the class described, the combination of a harp and wheel, a stem provided with means at its bottom or lower end to limit its upward movement, a barrel provided with a cam wall, a housing adapted to inclose the bottom or lower end of the barrel and harp stem, rings interposed between the barrel and harp and a spring located within the barrel and below the lowermost ring and a ring secured to one of the interposed rings, and adapted to inclose the spring and extended over the joint between the interposed rings, substantially as and for the purpose specified.

In testimony that I claim the above, I have hereunto subscribed my name in the presence of two witnesses.

GUSTAV EHMANN.

Witnesses:
RAY EHMANN,
F. W. BOND.